(12) United States Patent
Alstad et al.

(10) Patent No.: US 9,307,052 B1
(45) Date of Patent: Apr. 5, 2016

(54) EDGE SIDE LANDING PAGES

(71) Applicant: RADWARE, LTD., Tel Aviv (IL)

(72) Inventors: Kent Alstad, Sechelt (CA); Michael R. Benna, Vancouver (CA); Shawn Bissell, North Vancouver (CA)

(73) Assignee: Radware, Ltd., Tel Aviv (IL)

( * ) Notice: Subject to any disclaimer, the term of this patent is extended or adjusted under 35 U.S.C. 154(b) by 117 days.

(21) Appl. No.: 13/786,732

(22) Filed: Mar. 6, 2013

Related U.S. Application Data

(60) Provisional application No. 61/607,199, filed on Mar. 6, 2012.

(51) Int. Cl.
*G06F 15/16* (2006.01)
*H04L 29/06* (2006.01)

(52) U.S. Cl.
CPC ........................................ *H04L 67/42* (2013.01)

(58) Field of Classification Search
CPC ....................................................... H04L 67/42

USPC ........................... 709/203, 231, 217; 715/234
See application file for complete search history.

(56) References Cited

U.S. PATENT DOCUMENTS 7,203,758 B2\* 4/2007 Cook et al. .................... 709/231
2012/0290919 A1\* 11/2012 Melnyk et al. ................ 715/234

\* cited by examiner

*Primary Examiner* — Adnan Mirza
(74) *Attorney, Agent, or Firm* — M&B IP Analysts, LLC

(57) ABSTRACT

According to various embodiments of the present invention, acceleration can be used in connection with edge caching. Edge Side Landing Pages (ESL pages) are cached upstream on a Content Delivery Network (CDN), so as to reduce or eliminate round trips to the origin, thereby improving efficiency and reducing latency. ESL pages optimize performance for first time and repeat visitors for pages flagged to be cached upstream on the CDN. This allows pages cached on the CDN to be accelerated in addition to being cached. At the same time the system still efficiently serves requests to the origin for pages that are not cached on the CDN.

20 Claims, 4 Drawing Sheets

EDGE SIDE LANDING PAGES

CROSS-REFERENCE TO RELATED APPLICATIONS

The present application claims priority from U.S. Provisional Application Ser. No. 61/607,199 for "Edge Side Landing Pages", filed Mar. 6, 2012, the disclosure of which is incorporated herein by reference.

The present application is related to U.S. Utility application Ser. No. 12/426,909 for "Extensible, Asynchronous, Centralized Analysis and Optimization of Server Responses to Client Requests", filed Apr. 20, 2009, the disclosure of which is incorporated herein by reference.

The present application is related to U.S. Utility application Ser. No. 13/051,887 for "Automated Optimization Based on Determination of Website Usage Scenario", filed Mar. 18, 2011, the disclosure of which is incorporated herein by reference.

FIELD OF THE INVENTION

The present invention relates to techniques for accelerating web pages using edge caching.

DESCRIPTION OF THE RELATED ART

U.S. Utility application Ser. No. 13/051,887 describes a technique wherein an optimizer determines the probable state of a client's local cache, and uses such information to determine which type of optimization techniques, if any, should be applied. For example, the system can distinguish between at least two user scenarios that may benefit from different types of optimization, such as for example a first-time user and a returning user. Different types of optimization can be performed depending on the identified scenario. This technique, referred to as "landing page technology", can significantly improve the initial page view experience, as well as repeat views of that same page and the flow between the first page and the subsequent pages on the site.

In some environments it may not be practicable or possible to identify a particular user scenario for a given client request. Such issues may arise, for example, when implementing server architectures using base page caching, such as those available from Akamai Technologies, Inc. of Cambridge, Mass. Base page caching can cause difficulties in identifying user scenarios because complex key creation must generally be performed at the edge, requiring a significant increase in computational overhead.

In some environments, pages are cached at the edge of a Content Delivery Network (CDN). Conventionally, this means that unaccelerated pages need to be sent to the edge, preventing the use of acceleration techniques for the first few pages of a website visit. Such a limitation has a negative impact on the user experience when visiting the website.

The subject matter claimed herein is not limited to embodiments that solve any disadvantages or that operate only in environments such as those described above. Rather, this background is only provided to illustrate one example technology area where some embodiments described herein may be practiced.

SUMMARY

The present invention addresses this limitation by providing a mechanism by which acceleration can be used in connection with edge caching.

According to the techniques described herein, a new type of landing page is used for accelerating pages that are cached upstream on a Content Delivery Network (CDN). These landing pages, referred to herein as Edge Side Landing Pages (ESL pages) reduce or eliminate round trips to the origin, thereby improving efficiency and reducing latency. ESL pages optimize performance for first time and repeat visitors for all pages flagged to be cached upstream on the CDN.

By using ESL pages, the system of the present invention allows pages cached on the CDN to be accelerated in addition to being cached. At the same time the system still efficiently serves requests to the origin for pages that are not cached on the CDN.

The system of the present invention does not require that complex and expensive computation operation be done by edge side proxy code. The system is capable of operating in connection with base page caching, to supply a cache key that can be used when handling many optimizations of the same page based on different devices (i.e. browsers), scenarios (i.e. landing vs. non-landing pages), and the like.

In one embodiment, the system is implemented according to techniques described in U.S. Utility application Ser. No. 13/051,887 for "Automated Optimization Based on Determination of Website Usage Scenario", filed Mar. 18, 2011, the disclosure of which is incorporated herein by reference. However, when a new visitor is detected, the optimizer serves Edge Side Landing Pages. These pages represent a unified/single client group version of optimization techniques, aimed at best accelerating requests from most browsers. If it is determined that the client request came from a browser that does not fall into this category, the request is redirected (client side) to an appropriate landing page optimized for the detected browser In one embodiment, the system of the present invention encodes rules into the HTML pages served by a CDN. These rules are designed to flag requests such that they can be categorized into browser-specific cache groups by the CDN. When a browser makes its initial connection, a generically optimized page likely to be tailored for a large number of initial connections (for example, suited to most common browsers), is served. A script inserted in the HTML Page determines which cache group the current browser falls into. The results of the cache group determination are stored in a client cookie and sent on future requests. In the event that the current response (such as the one tailored for the most common browsers) is not appropriate for the current browser, the script performs a browser redirect operation designed to return a page tailored more specifically for the cache group.

The origin uses the cookie value set by the client script to determine which cache group tailored response to return for each request. The CDN also uses the cache group cookie as a basis for optionally edge-caching the responses. In one embodiment, the system of the present invention uses client script injected into the HTML, so that the CDN can cache all requests (including redirects).

The system of the present invention does not require complex cache group diagnostics to be implemented by the CDN cache, and can be deployed in most CDNs without requiring significant changes to the CDN logic.

In one embodiment, in addition to the script that is added to the initial connection sequence, a <noscript> variation is also included that redirects browsers that do not support script execution to a page tailored for that scenario.

Further details and variations are described herein.

BRIEF DESCRIPTION OF THE DRAWINGS

The accompanying drawings illustrate several embodiments of the invention. Together with the description, they serve to explain the principles of the invention according to the embodiments. One skilled in the art will recognize that the particular embodiments illustrated in the drawings are merely exemplary, and are not intended to limit the scope of the present invention.

DETAILED DESCRIPTION OF THE EMBODIMENTS

In one embodiment, the system of the present invention employs a new type of landing page, referred to herein as Edge Side Landing Pages (ESL pages, or ESLPs). ESL pages are designed to be compatible with existing CDN HTML caches. In one embodiment, a flag can be set by the web application so that Edge Side Landing Pages are returned only when this flag, referred to as a UseEdgeSideLandingPage.enabled flag, is set to true.

Figure 3:
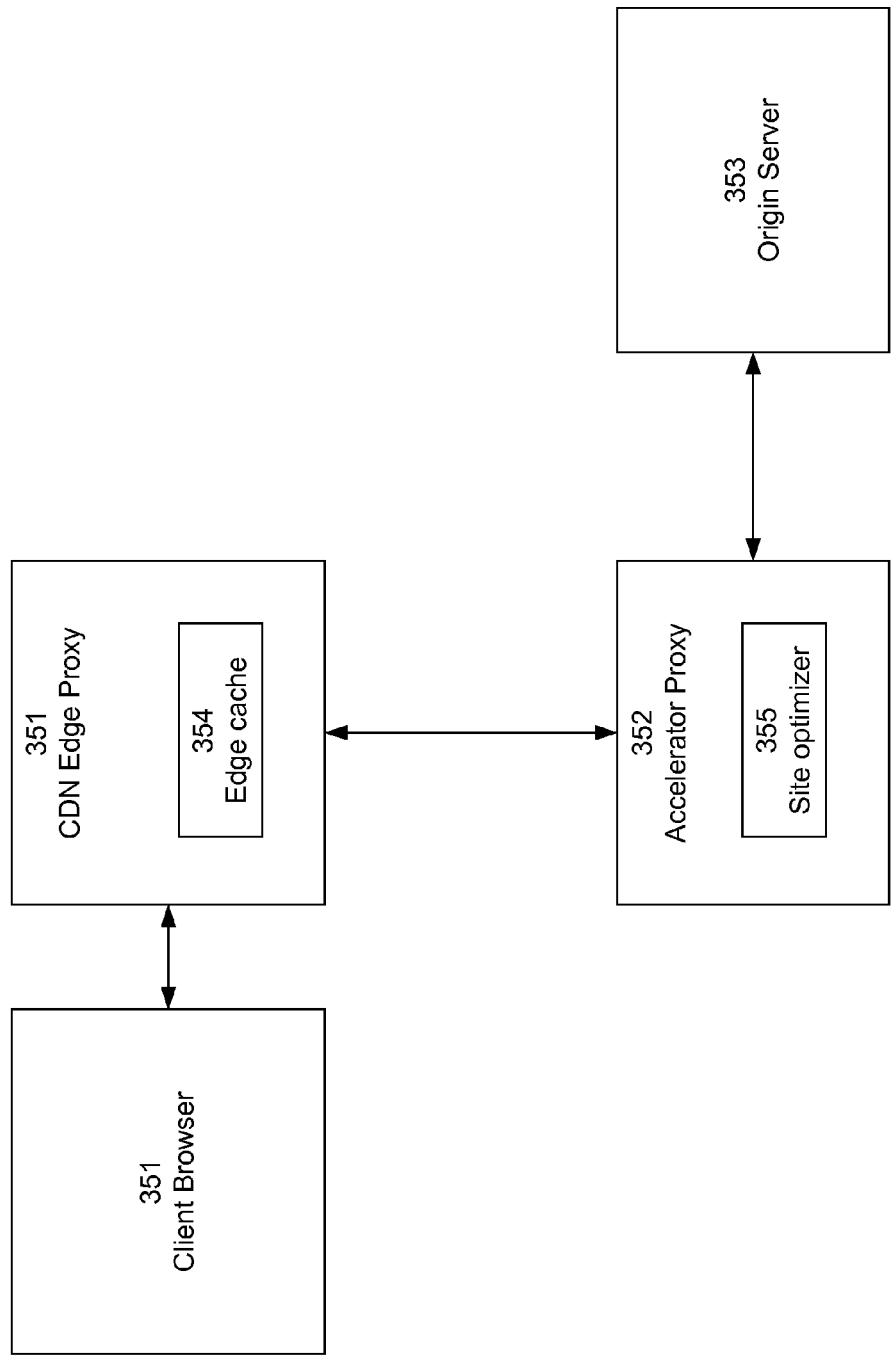
FIG. 3 is a block diagram depicting a network architecture for implementing the techniques of the present invention, according to one embodiment.

Referring now to FIG. 3, there is shown a network architecture for implementing the techniques of the present invention, according to one embodiment. Client browser 351 makes a request for an HTML page. The request is handled by CDN edge proxy 351, which has an edge cache 354 (also referred to as a CDN cache). CDN edge proxy 351 makes requests for web pages or other resources from origin server 353, which represents the server or servers which originally supply the content for the CDN to serve. Such requests can be intercepted by accelerator proxy 352 according to the techniques described herein. In one embodiment, accelerator proxy 352 includes a site optimizer 355 for performing the techniques described herein.

Edge Side Rules

In one embodiment, the CDN is configured to use edge caching rules in connection with the system of the present invention. The edge caching rules redirect requests to an array of cache groups for each URL based on a cache group cookie. Once the edge caching rules are configured, the system of the present invention serves requests.

Figure 1:
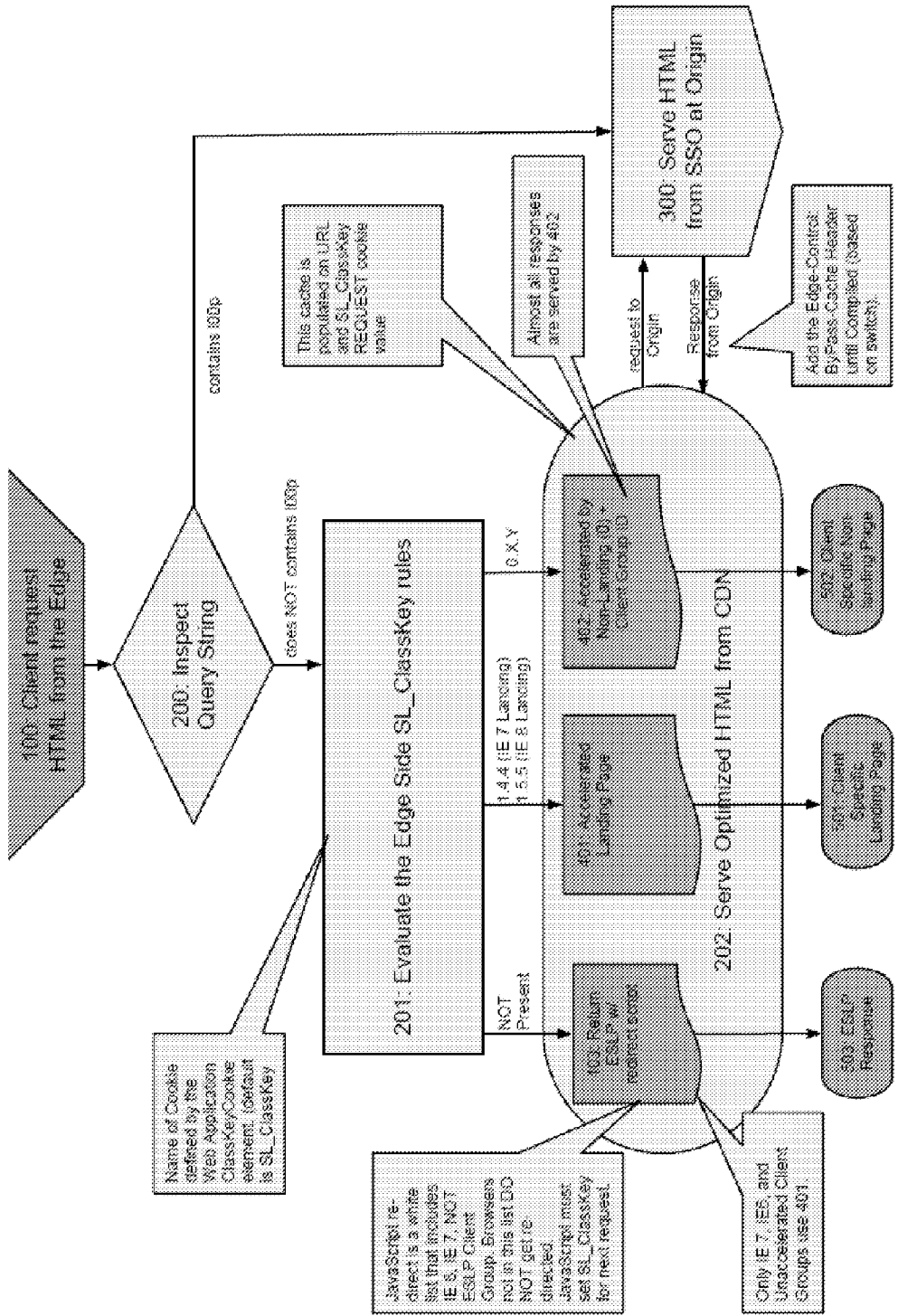
FIG. 1 is a flow diagram depicting a method of serving requests for web pages according to one embodiment of the present invention.

Referring now to FIG. 1, there is shown a flow diagram depicting a method of serving requests for web pages according to one embodiment of the present invention.

A client requests 100 an HTML page. An edge side rule is evaluated. In one embodiment, this evaluation is performed by inspecting 200 a query string associated with the request to determine whether it contains a particular string (in this example, the string is "100p", although any string can be used). In at least one embodiment, this string is used by the system in the "no script" condition. To ensure that requests that do not support script are sent all the way back to origin server 353, bypassing edge cache 354, a cookie is issued (via a response set-cookie header) that ensures that browsers that do not support script are served pages tailored for non-script supporting browsers. Edge cache 354 is encoded to ensure that all requests having the "100p" string in their URLs bypass edge cache 354.

If the string is found within the query string, then steps 201 and 202 are skipped, and the request is routed directly to origin server 353. Origin server 353 generates a response, according to techniques described in more detail below.

If the string is not found in the query string, additional edge side rules are evaluated 201. In one embodiment, the edge side HTML cache key is determined by combining the URL and the SL_ClassKey cookie value. If the requested item is not in edge cache 354, cache 354 is populated by forwarding the request to origin server 353.

If a previously cached HTML response (and corresponding key) matches the key for the current request (as determined in step 201) the response is returned directly from edge cache 354 without involving origin server 353. The responses stored at edge cache 354 are composed of optimized HTML, tailored for the requesting device. The selection of the appropriate response depends on the evaluation 201 of the Edge Side SL_ClassKey rules. In the event that the key for the current request determined in 201 does not match any of the previously cached response keys, the request is forwarded to origin server 353 and used to populated edge cache 354 for subsequent requests.

If the current request does not have a valid SL_ClassKey cookie request header value associated with it an ESL response is returned. This response can be returned either from edge cache 354 (if the cached ESL page response for the current key exists) or from origin server 353 if the appropriate response is not in edge cache 354. The ESL page is a response specially tailored for the 'initial request' for each device (i.e. useragent) session. The ESL page response is tailored to function correctly and to accelerate a wide range of compatible user agents (browsers).

In one embodiment, if the initial request is made from a user agent (browser 351) not in the common (ESLP category) the SL_ClassKey is set via script and the request is redirected such that a page tailored for the specific browser 351 is returned. This response is served from edge cache 354 when possible and from origin server 353 when edge cache 354 is not populated.

In one embodiment, if the SL_ClassKey begins with a "1", a browser-specific accelerated landing page 501 is served 401.

In one embodiment, if the SL_ClassKey begins with a "0", a browser-specific, non-landing page 502 is served 402. This SL_ClassKey is found in the majority of requests. Page 502 may be an optimized HTML page as described in the above-cited related applications.

Edge Cache Expiry Duration

In one embodiment, an edge cache expiry duration between 5 and 15 minutes can be imposed, although any suitable duration can be used. Depending on the duration, un-accelerated pages can be cached at edge cache 354 as the system warms up, but after the page compilation (warm-up) period (which may be, for example, 3 to 20 hours on large sites), the system functions as described above.

In one embodiment, a UseEdgeSideLandingPage.cacheUncompiledPages switch can be implemented. Toggling this switch to 'true' from the default 'false' prevents edge cache 354 from caching pages until they are fully compiled. This insures that pages cached for long durations at the edge have the best possible acceleration. In one embodiment, such a switch may be useful in situations where long edge-side cache durations are used (such as those exceeding 15 minutes).

Site Optimizer Rules

In one embodiment, once the Edge Side Rules described above are put in place, the site optimizer 355 Web Application's UseEdgeSideLandingPage.enabled switch is toggled to 'true' from the default of 'false'. This tells site optimizer 355 to treat all landing pages as ESL pages.

By default, all pages can be considered landing page candidates. Thus, if there is a change to the edge caching rules that define which HTML pages to cache, no configuration change on site optimizer 355 is required.

Figure 2:
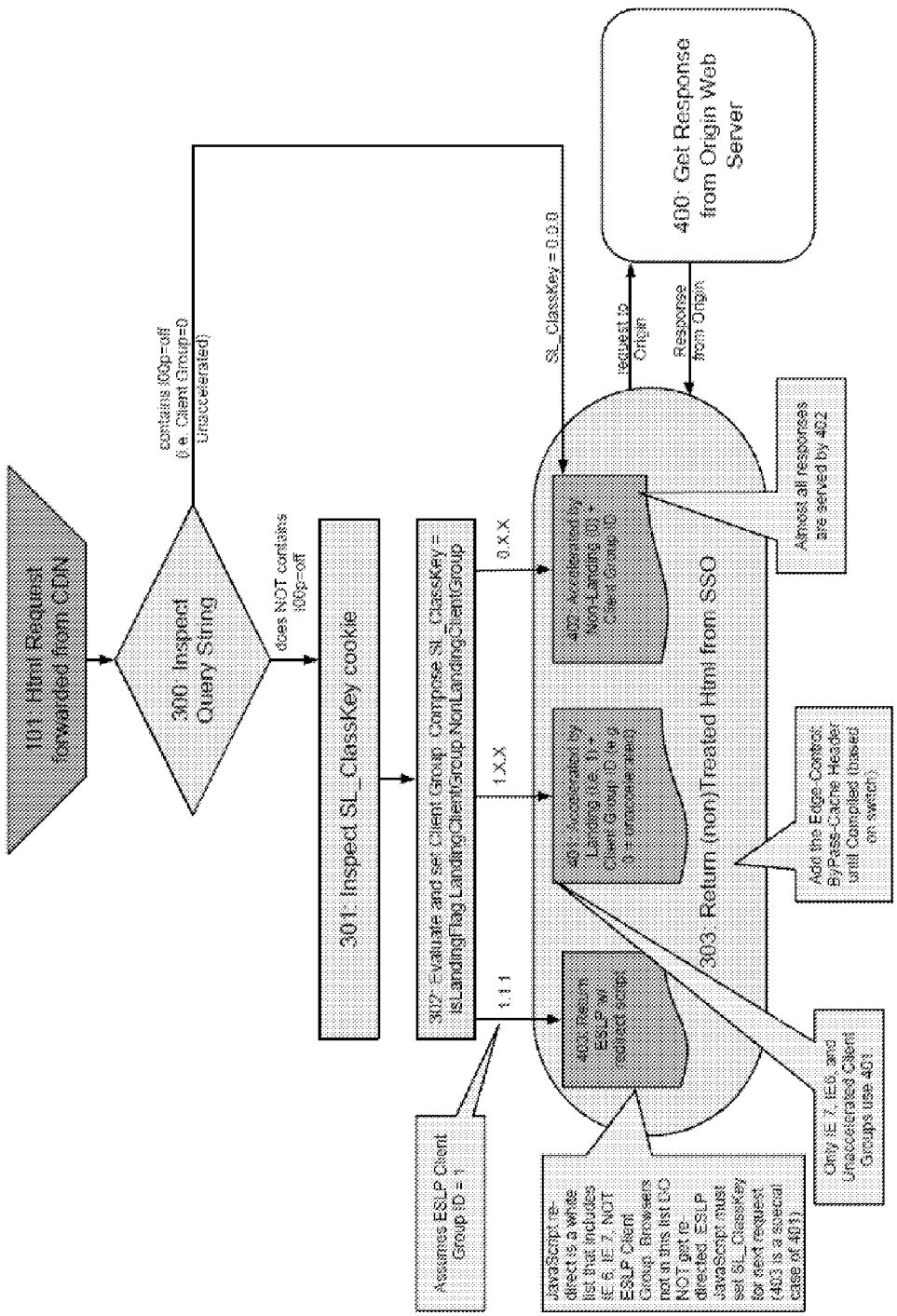
FIG. 2 is a flow diagram depicting a method of serving requests for web pages once the UseEdgeSideLandingPage.enabled switch is toggled to 'true', according to one embodiment of the present invention.

FIG. 2 illustrates how site optimizer 355 services a request when the UseEdgeSideLandingPage.enabled switch is toggled to 'true'.

Client browser 351 requests a page that is not cached at the edge. The request is forwarded 101 by the CDN to origin server 353. Accelerator proxy 352, including site optimizer 355, is positioned in series before origin server 353, so as to intercept requests bound for origin server 353. Site optimizer 355 receives the request and inspects 300 the query string of the URL to check whether it contains the string "100p=off". If the "100p=off" string is found, all site optimizer 355 proxy acceleration operations are bypassed, and an un-accelerated response is returned 400 from the origin server 353. In one embodiment, to achieve this, the SL_ClassKey header is overwritten (i.e. superseding the user-agent categorization) with a value of 0.0.0 so that the request is treated as though it has an SL_ClassKey of 0.0.0 (i.e. unsupported/un-accelerated user-agent) and the request is routed as shown in step 402.

If the "100p=off" string is not found, the request is directed 302 to the appropriate accelerated response path based on the value of the SL_ClassKey cookie. In step 403, if the cookie is not present, the ESLP response is returned. This response uses a client-side script to set the SL_ClassKey cookie value for future requests and should only be encountered once per user session (longer is some embodiments if persistent cookies are used). In step 401, if the cookie value begins with a "1", this indicates that the request represents an initial user connection but the user-agent does not support the common ESLP Html features and thus needs tailoring. The request has been redirected back to origin server 353 by a script included with the ESLP with the aim of receiving a response tailored for the specific non-ESLP user-agent (browser 351). In step 401, a script is included with the response that sets the SL_ClassKey to begin with a "0" to indicate that the session is not in the initial connection state (i.e. non-landing page), so as to avoid future redirections. In step 402, if the request value begins with a "0", this indicates that the initial connection has taken place and the SL_ClassKey has been determined. In one embodiment, several clauses are added to the SL_ClassKey used to indicate to which client group the user-agent belongs for both landing and non-landing scenarios. Site optimizer 355 uses the SL_ClassKey value to determine which acceleration techniques to apply to the response. In step 402, the non-landing page response tailored for the user-agent is returned.

Exception Conditions
Handling Invalid ESLP Cookie Values

If, by hacking, corruption, or programmer error, an invalid ESLP Cookie value is encountered, the system is able to handle the condition as follows.

In one embodiment, a validation step is performed in the client JavaScript and at accelerator proxy 352 to validate the format of the ESLP cookie value. In one embodiment, values that conform to the input criteria are accepted; incorrect and invalid values are set to null and treated as if the cookie is not present.

ESLP and Progressive Preloading

Figure 4:
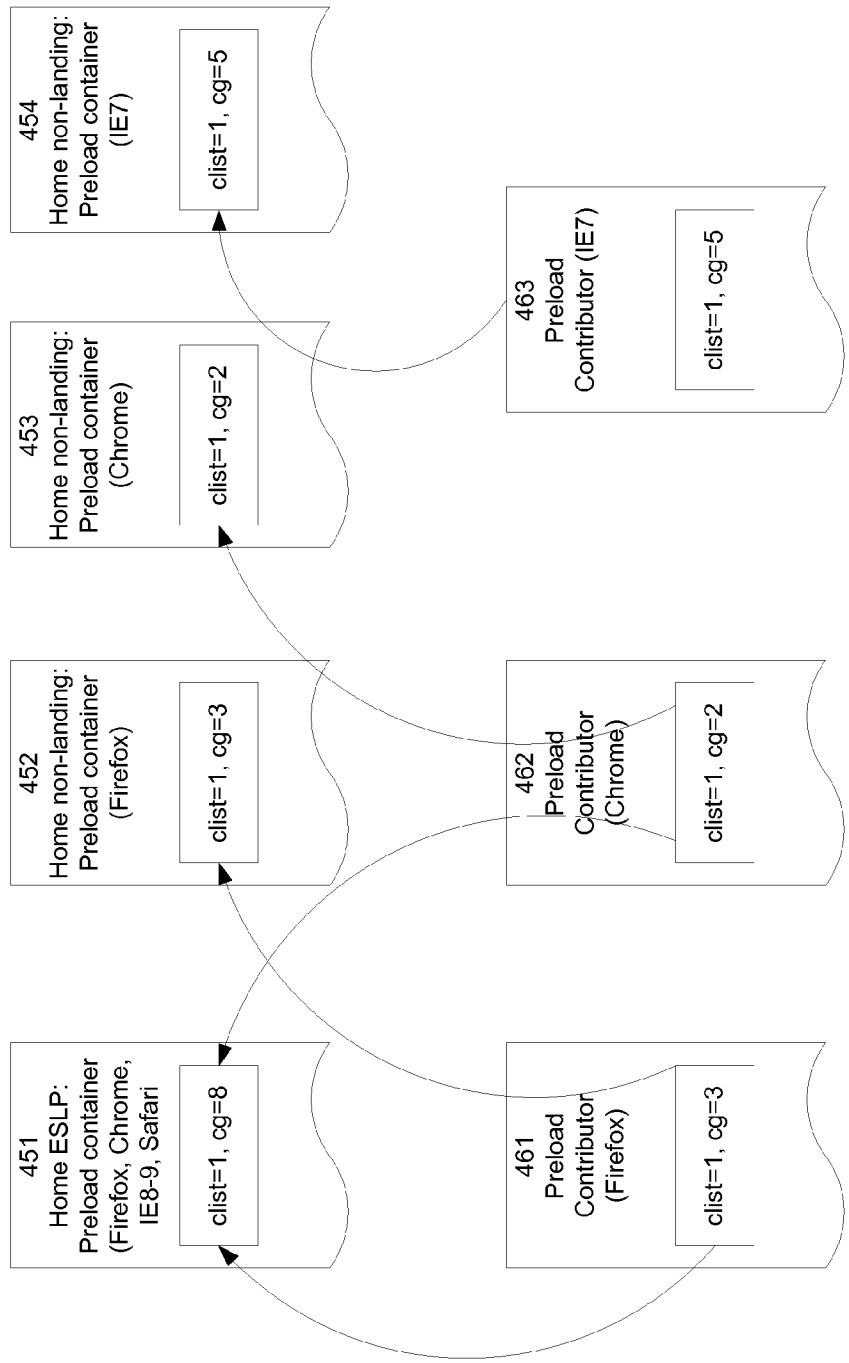
FIG. 4 is a block diagram depicting an example of the use of the ESLP techniques of the present invention in connection with resource preloading, according to one embodiment.

FIG. 4 illustrates an example of the use of the ESLP techniques described herein in connection with resource preloading, i.e., when resource preload lists are used on ESLP cached pages. Pages 451 through 454 are examples containing preload lists that load resources designed to prime the browser cache with resources that will be used on pages 461 through 463. The system samples, analyzes and constructs resource lists that are added to scripts and included on pages 451 through 454. Either page 461 or 463 can contribute items to the list included with the ESLP. The ESLP list differs from other preload lists in that it includes resources that are found across all of the browsers targeted by the ESLP, which may be, for example, most common browsers.

Operation

In one embodiment, the system of the present invention is implemented in environments wherein an upstream CDN is in place that caches at least some HTML content. A system operator configures edge cache 354. Then, the UseEdgeSideLandingPage.enabled switch in the Web Application is set to 'true'.

In one embodiment, the default condition is to configure the classification rules so that all pages are landing page candidates. Alternatively, the system can be configured so that those pages that will be cached on the CDN edge side are landing page candidates.

In one embodiment, only the first hit for a first time visitor (i.e. when SL_ClassKey cookie is not present, signifying that this is a priming request) results in an ESL page. Thus, most hits are serviced by existing browser specific treatments as described in the above-cited related applications. If browser 351 is not in the ESLP client group (for example, Internet Explorer 6, 7, and unsupported) and browser 351 supports JavaScript, then the request is redirected (client-side) to a page specifically tailored for the given browser 351. For example, if an Opera browser (unsupported client group) requests a page where the SL_ClassKey cookie is not present, then the ESL page is returned and some JavaScript in that page immediately causes the client to redirect to the Opera-browser-specific page. If Firefox 4 (ESLP client group) requests the same page, then the JavaScript on the ESL page does not cause a redirect and the ESL page is used directly.

In one embodiment, if the page being requested is specifically configured as 'Not a landing page candidate', then the non-landing page is returned. If the page is set to be cached on the edge, then edge cache 354 is populated with pages accelerated for various browsers, for example on a random basis.

Variations

In one embodiment, the CDN can be configured to introduce a request header when a page response will be potentially cached on the CDN. A corresponding change is made in site optimizer 355 configuration so that the correct header is used to flag when ESL pages are required. This enables site optimizer 355 to eliminate redirects and serve all origin requests with browser-specific HTML.

In one embodiment, site optimizer 355 can be configured to include an edge cache header directive that instructs edge cache 354 not to cache a response. Site optimizer 355 includes this directive before pages reach the fully compiled state. This directive ensures that only fully compiled pages are cached at the edge; such a configuration can be especially helpful when the system is configured with longer edge cache durations.

USAGE EXAMPLES

The following are examples of usage scenarios.
Scenario 1: Landing or Non-Landing Page Visit to an Uncompiled/Unaccelerated Page Cached at the Edge The unaccelerated page is cached at the edge for the short duration of edge cache 354. When cache 354 is populated the next time, the compiled page is returned, as described in Scenario 2.

Scenario 2: Landing Page Visit to a Compiled/Accelerated Page Cached on the Edge The ESL page is returned. In this case, the ESLP cookie is not present and will be set by the JavaScript on the client. This page will re-direct IE 6, IE 7, and any Non-ESLP JavaScript enabled browsers to a browser-specific landing page.

Scenario 3: Landing or Non-Landing Page Visit to an Uncompiled/Unaccelerated Page Served at the Origin The unaccelerated page is returned, as in Scenario 1.

Scenario 4: Non-Landing Page Visit to a Page Cached on the Edge or Served from the Origin A browser-specific non-landing page is returned. When the page is served from the origin, the system functions normally, returning pages optimized by browser group. When the page is cached at the edge, it is cached by ESLP SL_ClassKey cookie value, which ensures that the edge serves the correct content to each browser group.

Setup Guide

In one embodiment, non-default configuration changes are made by editing the corresponding XML file. In one embodiment, the following changes are made to the MobiusConfig.xsd file to facilitate operation in connection with the present invention.

Change ESLP Cookie Name

A per-web application ClassKeyCookie element allows setting of the cookie's attributes such as domain, path and expiry. In one embodiment, the cookie's name is configured globally (in the ClientGroups element, described below) so that the client group can be selected before the web application is determined.

<WebApplication>
        <ClassKeyCookie enabled="true" domain="" path=""
            expirySeconds="129600"/>
    </WebApplication>

The domain attribute behaves differently than the SL_Audience cookie. If blank (" "), the SL_ClassKey cookie will not have a domain. In that case, the cookie is associated to the requested host name. If the domain is not blank, it begins with a dot, for example, ".example.com".

The cookie's path is controlled by the path attribute. In particular, if this attribute is blank (" "), the containing web application's root path, i.e. value of the WebApplication.fqdn attribute, is used as the cookie path.

SL_ClassKey expiry duration

An expirySeconds attribute in the element ClassKeyCookie specifies the expiry duration for landing pages. In one embodiment, this value is set to a default of 129600 seconds (1 week).

Use Client Group IDs in SL_ClassKey Cookie Value

In one embodiment, the name of the Class Key cookie is configurable as an attribute of the ClientGroups node. The default cookie name is "SL_ClassKey".

A boolean attribute, "useIdInCookie", in the ClientGroups node indicates if the client group IDs in the class key cookie value can be used for finding the client groups. If the attribute is set to "false", or if the cookie is not found, or if the cookie value is not valid, the filters are run against the User-Agent request header value to find the client groups. In one embodiment, the switch is on by default.

When the cookie is found to have a broken value, a new class key cookie is added to the HTML response with the correct value.

<ClientGroups         cookieName="SL_ClassKey"
        useIdInCookie="true"
        <ClientGroup id= . . . >
        </ClientGroup>
    </ClientGroups>

Add UseEdgeSideLandingPage settings to Web Application

A Boolean "enabled" attribute is provided. When "true", it instructs the SSO to treat all Landing Pages as Edge Side Landing Pages (ESLP). When the attribute is "false", the system functions normally and the page is treated for a specific client group.

<WebApplication>
        <UseEdgeSideLandingPage enabled="true" I>
    </WebApplication>

Add No-Cache Edge Directive

In one embodiment, if the ESLP page being requested has not been compiled, an un-accelerated page without the ESLP re-direct script is returned. It is assumed that the Edge-cache expire is relatively short (less than 10 minutes), so that the page will fall out of cache and an accelerated page will replace it on the next request.

In one embodiment, a no-cache directive is available, which instructs edge cache 354 to not cache pages until they reach the compiled state, at which point the origin SSO stops inserting the no-cache edge directive. This can be useful if edge cache expiry is relatively long.

<WebApplication>
        <UseEdgeSideLandingPage
            enabled="true"cacheUncompiledPages="true"/>
    </WebApplication>

Only Treat Request with Edge Cache Flag as ESLP

In one embodiment, the system only returns an ESL page when the edge side cache flags the request by adding a header or a cookie. This is an optional enhancement to the system. To set this switch, the Edge side cache is configured to add the Flag header when edge side HTML caching will be performed.

<WebApplication>
        <UseEdgeSideLandingPage         enabled="true"
            cacheUncompiledPages="true"
            useEdgeHeader="false" edgeHeaderName=" "/>
    </WebApplication>

Add LandingOnly=true|false switch to Client Group

In one embodiment, each Client Group has a Boolean element called LandingOnly. When set to "true", the Client Group only applies to landing pages. When set to "false" the Client Group applies to both landing and non-landing pages. By default, the LandingOnly value is "false".

Add Edge Side Landing Page Client Group

In one embodiment, a new client group is established, which uses the LandingOnly=true default Client Group setting. This means that, initially, ESLP is only be used for landing pages. In one embodiment, the new group includes the following filters.

| Browser |
|---|
| Chrome (all versions) |
| FireFox (all versions) |
| Internet Explorer 8 |
| Internet Explorer 9 and above |
| Safari (all versions) |

User Interface

Changing the XML file as described above is one way to configure the system to operate in connection with the present invention. In other embodiments, a web-based user interface can be provided to make appropriate configuration changes to the system.

Operation in Connection with Search Bots

In one embodiment, the system of the present invention responds to requests from search bots (such as Googlebot) by always serving an ESL page, as long as there is an ESL page already compiled. The request from the search bot is treated as though it came from a common browser such as Internet Explorer 8.

One skilled in the art will recognize that the examples depicted and described herein are merely illustrative, and that other arrangements of user interface elements can be used. In addition, some of the depicted elements can be omitted or changed, and additional elements depicted, without departing from the essential characteristics of the invention.

The present invention has been described in particular detail with respect to possible embodiments. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment of the invention. The appearances of the phrases "in one embodiment" or "in at least one embodiment" in various places in the specification are not necessarily all referring to the same embodiment.

In various embodiments, the present invention can be implemented as a system or a method for performing the above-described techniques, either singly or in any combination. In another embodiment, the present invention can be implemented as a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware and/or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, DVD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

Accordingly, in various embodiments, the present invention can be implemented as software, hardware, and/or other elements for controlling a computer system, computing device, or other electronic device, or any combination or plurality thereof. Such an electronic device can include, for example, a processor, an input device (such as a keyboard, mouse, touchpad, trackpad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or non-portable. Examples of electronic devices that may be used for implementing the invention include: a mobile phone, personal digital assistant, smartphone, kiosk, server computer, enterprise computing device, desktop computer, laptop computer, tablet computer, consumer electronic device, or the like. An electronic device for implementing the present invention may use any operating system such as, for example and without limitation: Linux; Microsoft Windows, available from Microsoft Corporation of Redmond, Wash.; Mac OS X, available from Apple Inc. of Cupertino, Calif.; iOS, available from Apple Inc. of Cupertino, Calif.; Android, available from Google, Inc. of Mountain View, Calif.; and/or any other operating system that is adapted for use on the device.

While the invention has been described with respect to a limited number of embodiments, those skilled in the art, having benefit of the above description, will appreciate that other embodiments may be devised which do not depart from the scope of the present invention as described herein. In addition, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. A computer-implemented method for responding to a page request, comprising:
    receiving a request for a webpage originating at a client;
    evaluating at least one edge side rule in connection with the request, wherein the at least one edge side rule is encoded into a webpage served by a content delivery network (CDN); and
    responsive to the evaluation of the at least one edge side rule, determining if the response should be directly served by any of: an origin server, an edge cache of the CDN, and an acceleration device, wherein the response served by the acceleration device includes returning an edge side landing (ESL) page response tailored for the received request, the ESL page response including a script causing the client to evaluate suitability of the response and, responsive to the response not being suitable, to issue a redirect request for a suitable page, wherein the request is directly served by the origin server when a predefined string included in the request indicates that the client browser does not support edge caching.

2. The method of claim 1, wherein evaluating the at least one edge side rule further comprises:
    determining if the request includes the predefined string, a valid key, and a matching response key.

3. The method of claim 2, further comprising:
    upon determining that the request does not contain the predefined string and that the request contains the matching response key, serving the request directly by the edge cache, wherein the matching response key indicates that a previously cached response exists.

4. The method of claim 3, wherein serving the request directly by the edge cache further comprising:
    evaluating a plurality of additional edge side rules to determine an appropriate optimized webpage as the response to the requesting client.

5. The method of claim 2, further comprising:
    upon determining that the request does not contain the predefined string and that the request does not contain the matching response key, forwarding the request to the origin server; receiving a response from the origin server; and populating an edge cache using the received response.

6. The method of claim 2, further comprising:
    upon determining that the request does not contain the valid key, returning the ESL page response, wherein the ESL page response is tailored to accelerate a plurality of compatible user agents of a client.

7. The method of claim 6, wherein the script included in the ESL page determines which cache group a current user agent of the client falls into, wherein the results of the cache group determination are stored in the client and sent on future requests.

8. The method of claim 4, wherein the optimized webpage is stored on an edge cache for a length of time equal to an edge cache expiry duration after receiving the request.

9. The method of claim 2, further comprising:
    upon determining that the request does not contain the matching response key and that the request contains the predefined string, serving the request directly by the origin server, wherein the matching response key indicates that a previously cached response exists.

10. The method of claim 9, wherein serving the request directly by the origin server further comprises:
    forwarding the request to an origin server; and
    receiving a response from the origin server.

11. A non-transitory computer readable medium having stored thereon instructions for causing one or more processing units to execute the method according to claim 1.

12. A system for conducting search-by-content, comprising:
    a processor; and
    a memory, the memory containing instructions that, when executed by the processor, configure the system to:
    receive a request for a webpage originating at a client;
    evaluate at least one edge side rule in connection with the request, wherein the at least one edge side rule is encoded_into a webpage served by a content delivery network (CDN); and
    responsive to the evaluation of the at least one edge side rule, determine if the response should be directly served by any of: the system, an origin server, and an edge cache of the CDN, wherein the response served by the system is returning an edge side landing (ESL) page response tailored for the received request, the ESL page response including a script causing the client to evaluate suitability of the response and, responsive to the response not being suitable, to issue a redirect request for a suitable webpage, wherein the request is directly served by the origin server when a predefined string included in the request indicates that the client browser does not support edge caching.

13. The system of claim 12, wherein the system is further configured to:
    determine if the request includes the predefined string, a valid key, and a matching response key.

14. The system of claim 13, wherein the system is further configured to:
    upon determining that the request does not contain the predefined string and that the request contains the matching response key, serve the request directly by the edge cache, wherein the matching response key indicates that a previously cached response exists.

15. The system of claim 14, wherein the system is further configured to:

evaluate a plurality of additional edge side rules to determine an appropriate optimized webpage as the response to the requesting client.

16. The system of claim 13, wherein the system is further configured to: upon determining that the request does not contain the predefined string and that the request does not contain the matching response key, forward the request to the origin server; receive a response from the origin server; and populate an edge cache using the received response.

17. The system of claim 16, wherein the system is further configured to:
   upon determining that the request does not contain the valid key, return the ESL page response, wherein the ESL page response is tailored to accelerate a plurality of compatible user agents of a client device.

18. The system, of claim 17, wherein the script included in the ESL page determines which cache group a current user agent of the client falls into, wherein the results of the cache group determination are stored in the client and sent on future requests.

19. The system of claim 15, wherein the optimized webpage is stored on an edge cache for a length of time equal to an edge cache expiry duration after receiving the request.

20. The system of claim 13, wherein the system is further configured to:
   upon determining that the request does not contain the matching response key and that the request contains the predefined string, serve the request directly by the origin server, wherein the matching response key indicates that a previously cached response exists.

* * * * *